May 9, 1933.   W. B. SHIRK   1,907,596
POWER SYSTEM
Filed May 27, 1929   2 Sheets-Sheet 1

INVENTOR
*William B. Shirk.*
BY
ATTORNEY

May 9, 1933.  W. B. SHIRK  1,907,596
POWER SYSTEM
Filed May 27, 1929  2 Sheets-Sheet 2

INVENTOR
William B. Shirk.
BY
ATTORNEY

Patented May 9, 1933

1,907,596

UNITED STATES PATENT OFFICE

WILLIAM B. SHIRK, OF FOREST HILLS, PENNSYLVANIA, ASSIGNOR TO WESTINGHOUSE ELECTRIC & MANUFACTURING COMPANY, A CORPORATION OF PENNSYLVANIA

POWER SYSTEM

Application filed May 27, 1929. Serial No. 366,344.

My invention relates generally to electric-power systems and more particularly to power systems which may be utilized for driving rolling mills and similar machinery.

Heretofore, rolling mills have been driven by means of single motors transmitting power to the rolls through gear boxes. It has been found that a drive comprising a motor direct connected to each roll of the mill, ensures much more satisfactory operation and, consequently, produces a better finished product. Further, a gear box necessary for the single-motor drive is expensive and its cost, added to that of a single large motor, exceeds that of two smaller motors which may be utilized for an individual roll drive.

However, an individual-roll drive cannot be employed successfully unless special precautions are taken to maintain the relative speeds, and loads, of the motors, at a substantially constant value in order to maintain the system in stable operation. Since the motors are not rigidly connected together, and because the hot metal between the rolls is of a more or less pliable nature and will permit the rolls to run at slightly different linear speeds a motor-control system is provided to ensure a proper division of the load.

The object of my invention, generally stated, is to provide an electric drive for rolling mills which shall be simple and efficient in operation, and easily and economically manufactured and installed.

A more specific object of my invention is to provide for continuously balancing the speeds and loads of the separate roll motors of the electric drive of a rolling mill.

A further object of my invention is to provide for connecting the motors and generators of an individual-roll drive for rolling mills in a manner to cause them to cooperate to maintain a predetermined division of the load.

Another object of my invention is to provide, in a rolling-mill drive comprising alternately connected motors and generators, means for rendering both generators effective to produce an electrical balancing force upon either motor which may vary its predetermined operating speed and load with respect to another motor in the system.

Further objects of my invention will become evident from the following detailed description, taken in conjunction with the drawings in which.

Figure 1:
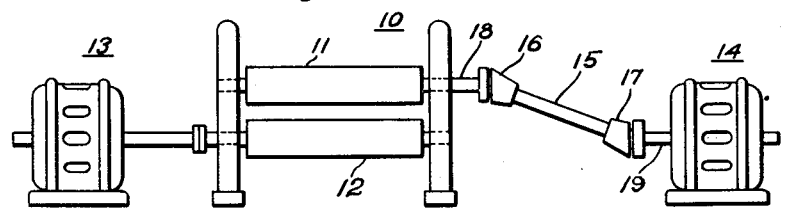
Figure 1 is a view in end elevation, of a rolling mill showing individual roll-driving motors.

Referring now to the drawings, 10 designates, generally, a rolling mill provided with a plurality of horizontal rolls 11 and 12, of a type to which my invention may be readily applied. While my invention is particularly adapted for application to rolling mills, it is to be understood that its use is not limited to rolling-mill drives only. In fact, it is particularly suited for driving machines of any type which have cooperating rolls, or cutter members, which are mechanically connected only through the agency of the material with which the rolls or cutters are in engagement. In this instance, the rolling mill illustrated is arranged for an individual roll drive in which a separate motor is connected to each roll.

As shown, the motor 13 is coupled to the lower or stationary roll 12, and a similar motor 14 to the upper or adjustable roll 11. As is well known, the upper roll of the mill is adjustable with respect to the lower roll. However, since rolling-mill structures of this kind are well known, a screw-down mechanism for adjusting the upper roll has not been shown. In order that the upper roll 11 may be adjusted, it is provided with a drive shaft 15 having a plurality of universal points 16 and 17, which are coupled to the roll spindle 18 and motor shaft 19, respectively.

Figure 2:
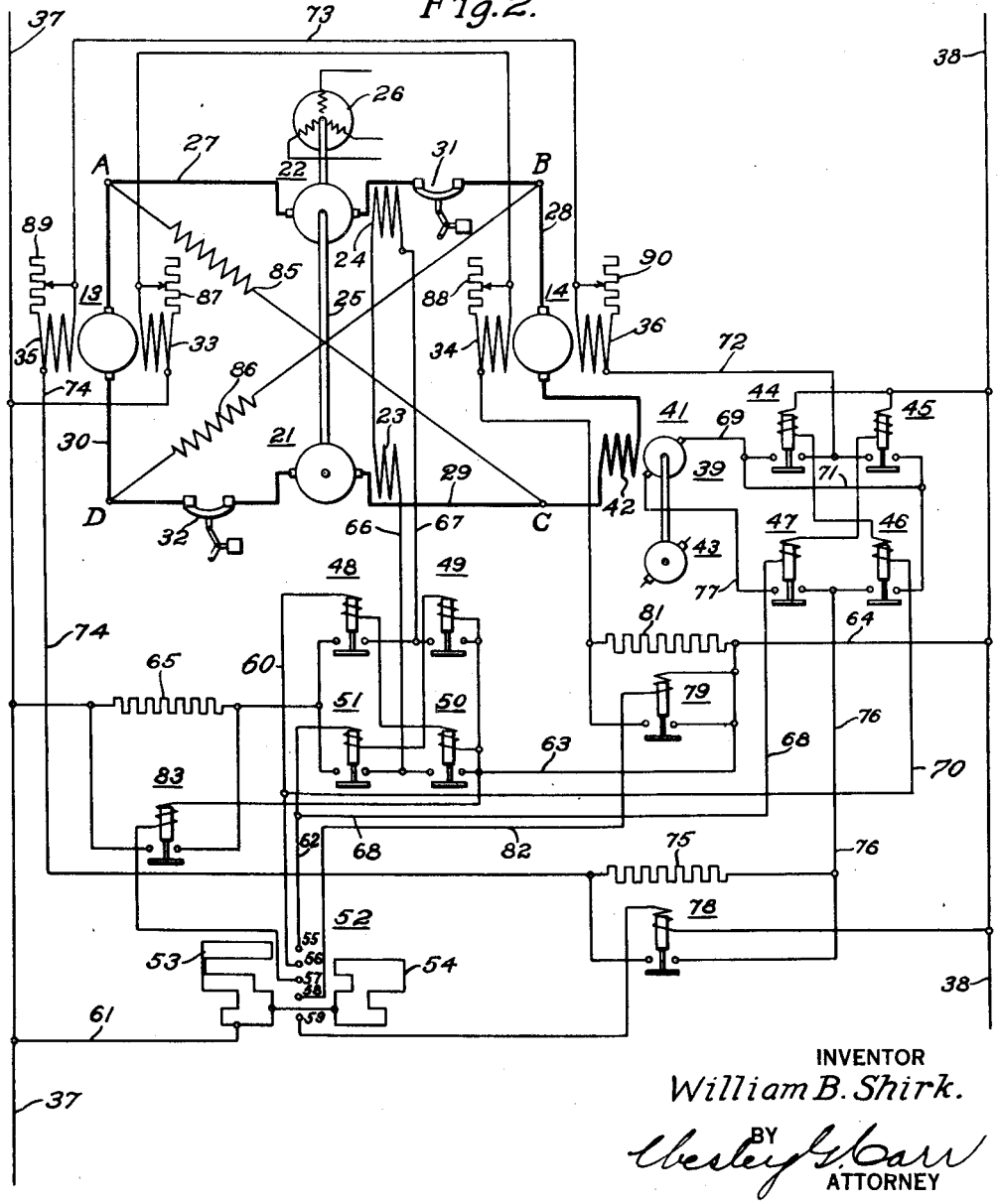
Fig. 2 is a diagrammatic view of a power system, embodying the principal features of my invention, which may be readily applied for driving a rolling mill of the type shown in Fig. 1.

In Fig. 2 of the drawings, is shown a power system, or electrical rolling-mill drive, including the individual-roll motors 13 and 14 and embodying the principal features of my invention.

In this embodiment of the invention, power is supplied to the roll motors 13 and 14 from a plurality of generators 21 and 22. The generators may be of any suitable type, preferably having substantially the same operating characteristics. In this instance, direct-current generators, provided with separately-excited field windings 23 and 24 are utilized. As shown, the generators are mechanically connected, through a shaft 25, and are disposed to be driven by a suitable prime mover such, for example, as a motor 26. Since the method of supplying power to a motor of this type is well known, it has been deemed unnecessary to further complicate the drawings by showing a suitable starting control for the motor.

For the purpose of explaining the features of this invention, it may be assumed that the generators 21 and 22 and the motor 26 are driven at substantially constant speed, as a motor-generator set, in a manner well known in the art. In the present embodiment, the motors 13 and 14, and generators 21 and 22 are connected alternately in a loop circuit by means of suitable conductors 27 to 30, inclusive. Circuit breakers 31 and 32, of any suitable kind, may be utilized for interrupting the main loop circuit between generators and motors of the respective pairs.

The roll motors 13 and 14 are provided with separately-excited main field windings 33 and 34, and compounding field windings 35 and 36, respectively.

The shunt-field windings of the motors and generators, respectively, may be supplied with exciting current from any suitable source of constant-voltage power, which may, in this instance, be represented by line conductors 37 and 38.

In order to provide exciting current for the compounding-field windings 35 and 36 of the motors, in proportion to the current flowing in the system, to thereby control the degree of field compounding in accordance with the load on the motors, a constant-speed series-exciter set 39 is provided. As shown, the exciter set 39 comprises an exciter generator 41 having a field winding 42 and a constant-speed motor 43 for driving the exciter. The exciter field winding 42 is connected in the main loop circuit to render the exciter voltage and, consequently, the degree of compounding, proportional to the load current flowing in the motor armatures.

Since, the direction of rotation of the roll motors 13 and 14 in this instance, is controlled by reversing the generator voltage which causes a reversal of current in the main loop circuit, provision must be made for simultaneously reversing the connection of the compounding-field windings to the series exciter which changes the direction of its voltage in accordance with the change in direction of the generator voltage. Accordingly, a plurality of reversing switches 44 to 47, inclusive, are provided.

In order to control the voltage of the generators 21 and 22, and thereby control the speed and direction of operation of the roll motors, a plurality of reversing switches 48 and 51, inclusive, are provided for controlling the flow of exciting current in the generator field circuit.

The operation of the generator field reversing switches 48 to 51, inclusive, and the motor field reversing switches 44 to 47, inclusive, may be controlled in any suitable manner. However, in this embodiment of the invention, a drum or master switch, shown generally at 52, is utilized. As shown, the master switch is provided with a forward drum segment 53, a reversing drum segment 54, disposed to be actuated into engagement with a plurality of stationary contact fingers 55 to 59, inclusive, to control the energization of the various switch-operating circuits which will be described in detail hereinafter.

In order that the features of my invention may be more readily understood, the operation of the power system will now be described in detail. Assuming that it is desired to operate the rolls 11 and 12 in a forward direction, the master-switch drum may be actuated to the first position in the forward direction, to engage the contact fingers 55, 58 and 59. Upon the engagement of the contact finger 55, an operating circuit for the generator-field-reversing switches 49 and 51 is established, which may be traced from the line conductor 37, through conductor 61, drum segment 53, contact finger 55, conductor 62, the operating coils of the switches 51 and 49 and conductors 63 and 64, to the line conductor 38.

Accordingly, in response to the closure of switches 49 and 51, an energizing circuit for the generator field windings 23 and 24 is established which extends from the line conductor 37, through the field-regulating resistor 65, reversing switch 51, conductor 66, field windings 23 and 24, conductor 67, reversing switch 49 and conductors 63 and 64, to the line conductor 38.

A second circuit is also established, in response to the energization of contact finger 55, for effecting the operation of the motor-field-reversing switches which extends from the energized conductor 62, through conductor 68 and the operating coils of the reversing switches 47 and 45, to the line conductor 38. Accordingly, upon the closure of switches 45 and 47, the exciter 41 is connected to the energizing circuit for the compounding-field windings 35 and 36, which may be traced from one terminal of the exciter armature, through conductors 69 and 71, switch 45, conductor 72, compounding-field winding 36, conductor 73, compounding-field winding 35, conductor 74, field-control resistor 75, conductor 76, switch 47 and conductor 77, to the opposite terminal of the exciter armature.

Simultaneously, with the establishment of the energizing circuit for the generator field windings, operating circuits for resistor-bridging switches 78 and 79 in the main field circuit and the compounding field circuit of the motors are established. As shown, when the contact finger 59 of the master switch 52 becomes energized, the resistor-bridging switch 78, which is connected across the field-control resistor 75, is energized and actuated to the closed position, thereby reducing the resistance of the compounding field circuit and subjecting the compounding-field windings 35 and 36 of the motors to full exciter voltage. Likewise, when the contact finger 58 becomes energized, there is established an operating circuit for the resistor-bridging switch 79 of the field-control resistor 81, which extends from the energized contact finger 58, through conductor 82, operating coil of the switch 79 and conductor 64, to the line conductor 38.

Therefore, it will be readily understood that the closure of the resistor-bridging switches 78 and 79 decreases the resistance of the exciting circuits of the main and compounding field windings of the motors to their minimum values, and, consequently, full-field excitation is obtained for starting.

Operation of the master switch to the second position in the forward direction energizes the contact finger 57 and, accordingly, establishes an operating circuit for the resistor-bridging switch 83 which closes its contact members to bridge the generator-field resistor 65 and thereby increases the voltage of the generators and the speed of the motors a predetermined amount.

The speed of the roll motors 13 and 14 may be further increased by actuating the controller to the third and fourth positions, respectively, thereby effecting the disengagement of the contact fingers 58 and 59, from the drum segment 53 to deenergize the resistor-bridging switches 78 and 79. Upon the opening of the switches 78 and 79, the field resistors 75 and 81 become effective to decrease the excitation current flowing in the main and compounding-field-winding circuits, and, consequently, cause the motors to increase their speeds to normal operating value.

The motors may be caused to operate in the opposite direction by actuating the master switch 52 in the reverse direction where the segment 54 engages contact fingers 56, 58 and 59 in its first position. The engagement of contact finger 56 establishes an energizing circuit for field-reversing switches 48 and 50 extending from line conductor 37, through conductor 61, segments 53 and 54, contact finger 56, conductor 60, operating coils of reversing switches 48 and 50 and conductors 63 and 64, to line conductor 38. A second circuit is also established from energized conductor 60, through conductor 70, operating coils of switches 46 and 44, to line conductor 38. Operation of the master switch to the second, third and fourth positions in the reverse direction effects the operation of the resistor-bridging switches 78, 79 and 83, in the same manner as described hereinbefore.

It will be readily understood that, when the mill is operating at full speed without metal between the rolls, the roll motors 13 and 14 may be caused to operate at a predetermined speed ratio, depending upon the excitation provided by their respective separately excited main-field windings. When the mill is running idle, the load current flowing in the main loop-circuit is low, causing the voltage of the series exciter 41 to be low, and the excitation of the compounding field windings of the motors does not produce sufficient flux to appreciably affect the speed of the motors.

Therefore, it will be evident that, if the motors 13 and 14 are designed to have substantially the same characteristics, the main fields 33 and 34 may be connected in series-circuit relation, thereby causing the same exciting current to flow through both and produce substantially equal amounts of field flux in the motors. This causes the rolls of the mill to operate at the same peripheral speed, assuming that they are of the same diameter, which is a condition necessary for performing a proper rolling operation.

After the metal has entered the rolls, it is necessary to maintain their peripheral speeds equal so that one side of the slab, which is being rolled, will not be pushed through the rolls slower or faster than the other, which often results in a buckling action of the metal as it emerges from the rolls. This requires complete stability of the power system, that is, the roll motors must not vary their speeds from a predetermined ratio throughout the rolling operation. In systems wherein the motors may be readily connected together by a shaft or otherwise, this requirement is easily satisfied. However, in this instance, the mechanical connection between the motors is only that provided by a comparatively soft piece of metal, and, therefore, a variation from a predetermined speed ratio may occur unless provision is made for correcting changes in load.

In this embodiment of the invention, the stabilizing or balancing effect for correcting the ratio of motor speeds is produced by utilizing the inherent characteristics of a loop circuit in which the motors and generators are arranged alternately and connected in series. As stated hereinbefore, the separate machines are connected in the loop circuit by means of conductors 27 to 30, inclusive. In a circuit of this kind, when it is operating in a balanced condition, a plurality of pairs of equi-potential points A—B and C—D, are automatically provided. Therefore, we may consider, for the purpose of discussion, that the connectors 27 to 30 inclusive are the means for establishing the equi-potential points. For the purpose of illustration, if we consider the generator currents to be flowing around the loop circuit in a clockwise direction, then the counter-electromotive forces of the motors are exactly opposite, or their effect is to tend to cause current to flow in the loop circuit in a counter-clockwise direction. Under such conditions, assuming that the system is balanced, the points A and C, and D and B, will be of substantially the same potential, that is, if a current conductor is so connected across the circuit between either the points A and C or D and B, no current would flow because the voltage at the point A is substantially equal to that at the point C, and the voltage at point B is substantially equal to that at point D.

Assuming now that a load condition is imposed upon the motor 14 which causes it to drop in speed, a corresponding drop in its counter-electromotive force will occur. The voltage of the generator 22 is also reduced, since it must supply a heavier load. Therefore, the potential of the point B is reduced to a value below that of the point D. Likewise, in the event that the motor 13 becomes overloaded and drops its speed, an unbalance of the points A and C is effected.

It will be readily understood that the ultimate effect of the unbalance between the motor loads will be that the heavily loaded motor will continually reduce its speed and finally acquire the whole load, since the system comprising the main loop circuit alone with the motors having no mechanical connection is inherently unstable. In order to provide for correcting the speeds of the motors to maintain the peripheral speed of the rolls at a predetermined ratio, provision is made for connecting the equi-potential points in the loop circuit to provide a plurality of local loop circuits, each circuit comprising one motor and one generator. Accordingly, a resistor 85 is connected between the equi-potential points A and C and a similar resistor 86 between the points B and D.

Considering again the condition which exists in the main-loop circuit, as a result of a reduction in speed of the roll motor 14, it will be readily understood that, when the point B becomes of lower potential than the point D, additional current from the generator 21 will flow in a clockwise direction around the local-loop circuit which comprises the generator 21, resistor 86 and the motor 14. Additional current will also be supplied by generator 22 to the motor 14 because the reduced counter electromotive force of the motor 14 causes the potential at point C to increase in value over that at point A which permits the excess current from generator 22 to flow through the connector 85. This provides an additional supply of current or power to the overloaded motor 14 from both generators, consequently increasing its torque to a value greater than that required to drive the roll and, therefore, the speed of the motor is increased. The balancing current flows from the generators 21 and 22 in their local-loop circuit until the electromotive force developed by the motor 14 is sufficient to raise the equi-potential point B to its normal value equal to that of D, which effectively stops the flow of current through the resistor 86 and to reduce the potential at point C to that of point A to stop the flow of current through resistor 85. The reduction in speed of the motor 14 that is necessary to initiate the flow of balancing power from the generators 21 and 22 in their local loop circuits, may be regulated or controlled by varying the effective value of the resistors 85 and 86. It is evident that the effective value of resistor 86 to prevent a circulation of current in the local circuit when the system is in a balanced condition must be greater than the combined resistance of the motor 13 and the generator 22, since, with respect to the generator 21, the connector comprising the resistor 86 is in parallel-circuit relation to the motor 13 and generator 22. The same is true with respect to the generator 22, since the connector, comprising the resistor 86, is in parallel-circuit relation to the motor 14 and the generator 21.

It will be readily understood that the effect of the local-loop circuits is to connect both of the generators in parallel-circuit relation to each of the motors, the parallel connection being controlled by the resistors 85 and 86 and rendered effective in response to the occurrence of a predetermined voltage unbalance in the system.

It is evident that the balancing effect established by the connectors, comprising the resistors 85 and 86, prevents either of the motors which may happen to lose its entire load from serious over-speeding. This would happen in the event that a roll spindle was twisted off during a rolling operation, which, if the resistor connectors 85 and 86 were not provided, would permit the motor without load to run at double speed, with double voltage imposed upon its armature. In this instance, the disconnected motor would develop double its normal counter-electromotive force, which would limit the current supply to the other motor to substantially normal value. Since this motor has double load and normal full-load current, it cannot develop sufficient torque to carry the load, and therefore, stalls before the metal passes completely through the rolls.

However, since the resistor connectors 85 and 86 provide local-loop circuits connecting all the generators in parallel-circuit relation to any one motor, the increased counter-electromotive force of the disconnected motor causes an unbalance in the equi-potential points of the system, as hereinbefore described, and current flows to the heavily loaded motor from both generators, and the disconnected motor runs at no-load speed.

In some instances, it may be desirable to utilize the motors 13 and 14 to drive rolls of different diameters at such relative speeds as to maintain the peripheral speed of the rolls equal. The rolls may be naturally of different diameters or, due to wear, one may have become smaller than the other. Therefore, in order to adjust the relative speeds of the motors, the separately excited main field windings 33 and 34 of the motors are provided with bridging rheostats 87 and 88, respectively.

It may also be desirable to vary the excitation of the compounding-field windings 35 and 36 in order to change the compounding effect in accordance with the change in the operating speeds of the motors to obtain good speed regulation and this may be accomplished by utilizing field bridging rheostats 89 and 90, as shown.

It will be readily understood that the functioning of the system to maintain a predetermined speed relation between the motors is the same regardless of the number of pairs of motors and generators there are in the loop circuit and the relative operating speeds of the motors, so long as a resistor connector is connected between every pair of equi-potential points in the loop.

Figure 3:
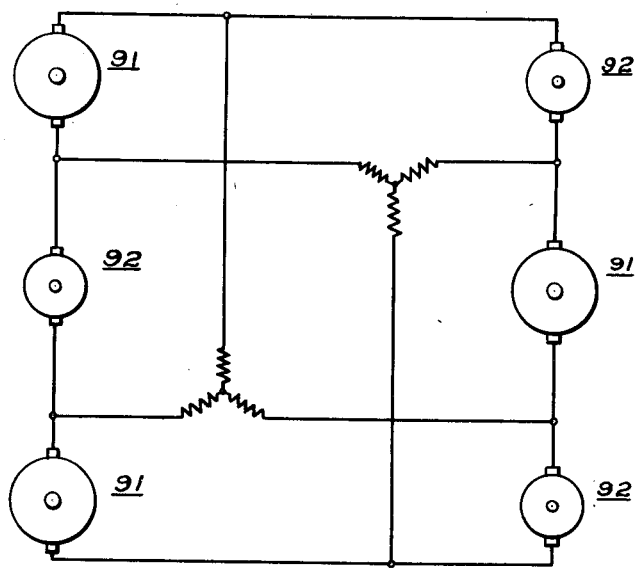
Figs. 3 and 4 are diagrammatic views showing how my invention may be applied to modifications of the system shown in Fig. 2, comprising a plurality of pairs of generators and motors.
Figure 4:
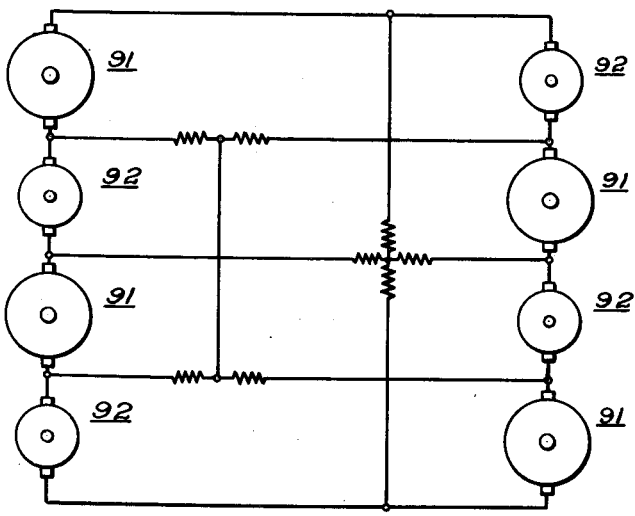

Figs. 3 and 4 show, in simple diagrammatic form, main loop circuits comprising three and four pairs of generators and motors, respectively.

As shown, each generator 91 and motor 92, comprising a pair, are bridged by a resistor connector, establishing six local-loop circuits in the first instance and eight local-loop circuits in the latter. In the systems shown in Figs. 3 and 4, one end of the resistor connectors is connected to a common point in order to reduce the total number of single resistors required.

Therefore, it is evident that my invention may be readily embodied in any individual roll drive, regardless of whether the mill is of the ordinary double-roll type or of a type provided with a greater number of rolls.

Since certain changes may be made in the above construction, and different embodiments of the invention may be made without departing from the spirit thereof, it is intended that all matter contained in the above description, or shown in the accompanying drawings shall be interpreted as illustrative and not in a limiting sense.

I claim as my invention:

1. In a power system, in combination, a plurality of generators and motors connected in series-circuit relation and disposed alternately to provide a loop circuit, and current-limiting means connected across each pair of machines, comprising a motor and a generator, to provide local-loop circuits, said local loop circuits serving to supply current from a plurality of generators to any motor to correct changes in speed between the motors.

2. In a power system, in combination, a plurality of mechanically-connected generators and a plurality of motors connected in series-circuit relation and disposed alternately in a loop circuit, and resistor means connected across the loop circuit between predetermined points to provide local circuits for supplying current from a plurality of generators to one motor upon the establishment of a predetermined voltage unbalance in the loop circuit resulting from a variation in a predetermined motor-speed ratio, thereby to correct for the unbalance.

3. In a power system, in combination, a plurality of generators and motors connected in series-circuit relation and disposed alternately in a loop circuit, and means including resistors connected across the main loop circuit between the respective motors and generators to provide separate loop circuits of higher resistance than the main loop circuit for concentrating a predetermined amount of power from all the generators upon a single motor in response to a predetermined load unbalance in the main loop circuit, thereby to effect a reestablishment of the load balance.

4. In a power system, in combination, a plurality of mechanically-connected generators, means for driving the generators at substantially constant speed and a plurality of motors, each generator being connected in a resistor-controlled loop circuit with a motor, said generators and motors being connected alternately in a main loop circuit, said resistor-controlled loop circuits being disposed to permit a flow of current only when the speed of one motor drops a predetermined amount with respect to a definite speed ratio between the motors, to render all the generators responsive to supply additional power to the motor which drops in speed, thereby to correct the speed ratio, and means for varying the voltage of the generators in the same proportion to vary the speed of the motors.

5. In a power system, in combination, a plurality of generators and motors connected in series-circuit relation and disposed alternately in a loop circuit, current-controlling means connected across the loop circuit to provide as many local loop circuits as there are pairs of motors and generators in the main loop circuit, said local-loop circuits being disposed to permit passage of current from all the generators to any one motor in response to a predetermined reduction in speed of said motor below a predetermined relative speed between the motors, thereby to reestablish said relative speed condition and means responsive to the current flowing in the loop circuit for controlling the excitation of the motors.

6. In a power system, in combination, a plurality of substantially equal-voltage generators, and a plurality of motors, said motors and generators being disposed alternately and connected in series relation to provide a loop circuit having a plurality of substantially equi-potential points, and a resistor connected across each pair of machines comprised of a motor and a generator, each resistor extending between the opposite points of equi-potential in the loop circuit, said resistors providing local-loop circuits for each pair of machines comprised of a motor and a generator to supply current from a plurality of generators to any motor when the motor speeds vary to co-operate in the maintaining of a predetermined speed ratio.

7. In a power system for a rolling mill, in combination, a plurality of motors, a plurality of generators for supplying power to the motors, said generators being mechanically connected and electrically connected in alternate series-circuit relation to the motors, and means including current-limiting devices for interconnecting predetermined sections of the series circuit to provide a separate path for circulating currents for each generator and motor, whereby balancing currents may flow from both generators into one motor in response to a variation between the relative speeds of the motors.

8. In an electric drive for rolling mills, in combination, a plurality of motors, a plurality of generators for supplying power to the motors, said motors and generators being connected alternately in a loop circuit, means for controlling the voltage of the generators to control the speed of the motors, and means comprising resistances connected across the loop circuit to provide local loop circuits comprising a motor and a generator, said means being disposed to permit current to flow from all the generators into a single local loop circuit in proportion to the reduction in counter-electromotive force of the roll motor in said local circuit, thereby to cause the motor to develop an excess torque and an increase in speed.

9. In an electric drive for rolling mills, in combination, a plurality of motors, said motors being similar in power and voltage characteristics, a similar number of generators having substantially the same power and voltage characteristics for supplying power to the motors, said motors and generators being connected alternately in series-circuit relation, a plurality of resistors connecting opposite sides of the circuit between each generator and motor, said resistors being disposed to permit current to flow from all the generators to a single motor in response to an unbalance between the counter-electromotive forces of the motors, thereby to automatically increase the torque of the motor having the lower counter-electromotive force.

10. In an electric drive for rolling mills, in combination, a plurality of motors, a source of power for the motors comprising a similar number of generators, said generators being electrically connected to the motors to subject each motor to a voltage not exceeding that of a single generator, means for adjusting the relative motor speeds, and means including a plurality of resistors for further connecting the generators and motors electrically to enable all the generators to supply power to a single motor, said means being responsive to a predetermined variation in the relative counter-electromotive forces of the motors.

11. In an electric drive for rolling mills, in combination, a plurality of motors, a generator for supplying power to each motor, said generators and motors being connected alternately in series-circuit relation, said generators being mechanically connected, and current-controlling means cross-connected between the motors and the generators for effecting a redistribution of current in the system in response to a variation of the relative speeds of the motors, thereby to maintain the torques of the motors in a predetermined ratio.

12. In a system of motor control, in combination, a plurality of motors, a plurality of generators for supplying variable-voltage power to the motors, said motors and generators being connected alternately in loop-circuit relation, means for varying the generator voltages to control the speeds of the motors, means for adjusting the relative speeds of the motors, and resistors of predetermined effective value connected to opposite points in the loop circuit between each motor and generator to maintain the relative speeds of the motors as their respective loads vary.

13. In a system of motor control, the combination with a plurality of motors and generators connected alternately in a main loop circuit, of means including resistors cross connected to predetermined points in the loop circuit for automatically controlling the voltage distribution of the loop circuit in the event of failure of either motor, means responsive to the current flowing in the main loop circuit for varying the excitation of all the motors, and manually-operable means for varying the excitation of the generators and the motors to control the speed of the motors.

14. In a power system, in combination, a plurality of generators and motors connected in series-circuit relation and disposed alternately to provide a main loop circuit, said generators being provided with separately-excited field windings, the motors having separately-excited field and compounding field windings, a series exciter for supplying excitation current to the compounding field windings of the motors, said exciter being disposed to develop a voltage proportional to the current flowing in the main loop circuit to automatically vary the degree of compounding of the motors as the load varies, means including a master switch for controlling the excitation of the generators and motors to vary the motor speeds and change the direction of operation, and resistors connected across the main loop circuit between each generator and motor to provide local loop circuits, thereby connecting the generators in parallel-circuit relation with each motor to cause said motors to maintain a pre-selected speed relation.

In testimony whereof, I have hereunto subscribed my name this 23rd day of May 1929.

WILLIAM B. SHIRK.